(12) United States Patent
Ho et al.

(10) Patent No.: US 9,203,319 B2
(45) Date of Patent: Dec. 1, 2015

(54) SOFT-START SWITCHING POWER CONVERTING APPARATUS WITH PULSE-FREQUENCY MODULATION TECHNIQUE

(71) Applicant: RICHTEK TECHNOLOGY CORP., Hsinchu County (TW)

(72) Inventors: Jyun-Che Ho, Chiayi County (TW); Jiun-Hung Pan, Taipei (TW); Chien-Fu Tang, Hsinchu (TW); Isaac Y. Chen, Hsinchu County (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 14/713,654

(22) Filed: May 15, 2015

(65) Prior Publication Data

US 2015/0249392 A1    Sep. 3, 2015

Related U.S. Application Data

(62) Division of application No. 14/014,642, filed on Aug. 30, 2013, now Pat. No. 9,130,464.

(30) Foreign Application Priority Data

Jul. 5, 2013    (TW) .............................. 102124164 A

(51) Int. Cl.
*H02M 3/335* (2006.01)
*H02M 3/36* (2006.01)

(52) U.S. Cl.
CPC ...... *H02M 3/33507* (2013.01); *H02M 3/33515* (2013.01); *H02M 3/33523* (2013.01); *H02M 3/36* (2013.01)

(58) Field of Classification Search
CPC .............. H02M 3/36; H02M 3/33507; H02M 3/33523; H02M 3/335
See application file for complete search history.

(56) References Cited

U.S. PATENT DOCUMENTS

| | | | | |
|---|---|---|---|---|
| 4,586,120 A * | 4/1986 | Malik | ..................... | H02M 1/32 363/21.16 |
| 6,088,244 A * | 7/2000 | Shioya | ..................... | H02M 1/32 323/902 |
| 6,661,679 B1 * | 12/2003 | Yang | ....................... | H02M 1/40 363/21.18 |
| 2012/0033465 A1 * | 2/2012 | Lee | .................... | H02M 3/33507 363/53 |
| 2012/0224397 A1 * | 9/2012 | Yeh | ................... | H02M 3/33507 363/21.12 |

* cited by examiner

*Primary Examiner* — Timothy J Dole
*Assistant Examiner* — Ishrat Jamali
(74) *Attorney, Agent, or Firm* — Osha Liang LLP

(57) ABSTRACT

A switching power converting apparatus includes a voltage conversion module, a detecting unit, and a switching signal generating unit. The voltage conversion module converts an input voltage into an output voltage associated with a secondary side current, which flows through a secondary winding of a transformer and is generated based on a switching signal. The detecting unit generates a detecting signal based on the output voltage and a predetermined reference voltage. The switching signal generating unit generates the switching signal based on the detecting signal and an adjusting signal so that the secondary side current is gradually increased during a start period of the switching power converting apparatus.

13 Claims, 15 Drawing Sheets

FIG.8a  Isecondary

FIG.8b  Is

FIG.8c  Iosc

FIG.8d  switching signal

SOFT-START SWITCHING POWER CONVERTING APPARATUS WITH PULSE-FREQUENCY MODULATION TECHNIQUE

CROSS-REFERENCE TO RELATED APPLICATION

This is a divisional application of U.S. patent application Ser. No. 14/014,642, filed on Aug. 30, 2013, which claims the priority of Taiwanese Application No. 102124164, filed on Jul. 5, 2013. This application claims the benefits and priority of all these prior applications and incorporates by reference the contents of these prior applications in their entirety.

BACKGROUND OF THE INVENTION

1. Field of the Invention

The invention relates to a power converting apparatus, and more particularly to a switching power converting apparatus.

2. Description of the Related Art

Referring to FIG. 1, a conventional flyback switching power converting apparatus is shown to include a voltage conversion module 9, and a switching controller 8. The voltage conversion module 9 includes a transformer 90, a transistor 91, a diode 92, and a capacitor 93. The transformer 90 includes a primary winding for receiving an input voltage (Vin) and a secondary winding. The transistor 91 is coupled between the primary winding of the transformer 90 and ground, and is controlled by a pulse width modulation (PWM) signal to conduct or non-conduct. The diode 92 is coupled to the secondary winding of the transformer 90 at its anode. The voltage conversion module 9 is operable based on the PWM signal to convert the input voltage (Vin) into an output voltage (Vout) across the capacitor 93. The larger a duty cycle of the PWM signal is, the larger a secondary side current (I2) flowing through the secondary winding of the transformer 90 will be. The switching controller 8 is operable to generate the PWM signal based on a reference voltage (Vref) and the output voltage (Vout) so that the smaller the output voltage (Vout) is, the larger the duty cycle of the PWM signal will be.

Initially, the output voltage (Vout) is not yet raised. Therefore, the duty cycle of the PWM signal generated by the switching controller 8 is maximum. In this case, referring to FIG. 2, a primary side current (I1) flowing through the primary winding of the transformer 90 and the transistor 91 becomes an inrush current at a time point (t1) that may result in damage to the transistor 91.

SUMMARY OF THE INVENTION

Therefore, an object of the present invention is to provide a switching power converting apparatus that can overcome the aforesaid drawbacks of the prior art.

According to one aspect of the present invention, a switching power converting apparatus comprises a voltage conversion module, a detecting unit, and a switching signal generating unit.

The voltage conversion module includes a transformer. The transformer includes a primary winding adapted to receive an input voltage, and a first secondary winding. The voltage conversion module is operable to generate a secondary side current flowing through the first secondary winding of the transformer based on a switching signal having a switching frequency, and to output an output voltage associated with the secondary side current.

The detecting unit is coupled to the voltage conversion module for receiving the output voltage therefrom, and is operable to generate a detecting signal based on the output voltage received thereby and a predetermined reference voltage.

The switching signal generating unit is coupled to the detecting unit and the voltage conversion module, receives the detecting signal from the detecting unit and an adjusting signal, and is operable to generate the switching signal based at least on the detecting signal and the adjusting signal so that the secondary side current is gradually increased during a start period of the switching power converting apparatus.

According to another aspect of the present invention, a switching power converting apparatus comprises a voltage conversion module, a detecting unit, and a switching signal generating unit.

The voltage conversion module includes a transformer. The transformer includes a primary winding adapted to receive an input voltage, a first secondary winding and a second secondary winding. The voltage conversion module is operable, based on a switching signal having a switching frequency, to generate a secondary side current flowing through the first secondary winding of the transformer so as to output an output voltage associated with the secondary side current, and to generate a sensing voltage across the second secondary winding. The sensing voltage is associated with a winding turns ratio of the first secondary winding to the second secondary winding, and the output voltage.

The detecting unit is coupled to the voltage conversion module for receiving the sensing voltage therefrom, and is operable to generate a detecting signal based on the sensing voltage, the switching signal and a predetermined reference voltage.

The switching signal generating unit is coupled to the detecting unit and the voltage conversion module, receives the detecting signal from the detecting unit and an adjusting signal, and is operable to generate the switching signal based at least on the detecting signal and the adjusting signal so that the secondary side current is gradually increased during a start period of the switching power converting apparatus.

BRIEF DESCRIPTION OF THE DRAWINGS

Other features and advantages of the present invention will be come apparent in the following detailed description of the preferred embodiments with reference to the accompanying drawings, of which:

FIGS. 8a to 8d are plots illustrating a secondary side current (Isecondary), a sensing signal (Is), an oscillating signal (Iosc), and a switching signal of the second preferred embodiment, respectively;

DETAILED DESCRIPTION OF THE PREFERRED EMBODIMENTS

Figure 1:
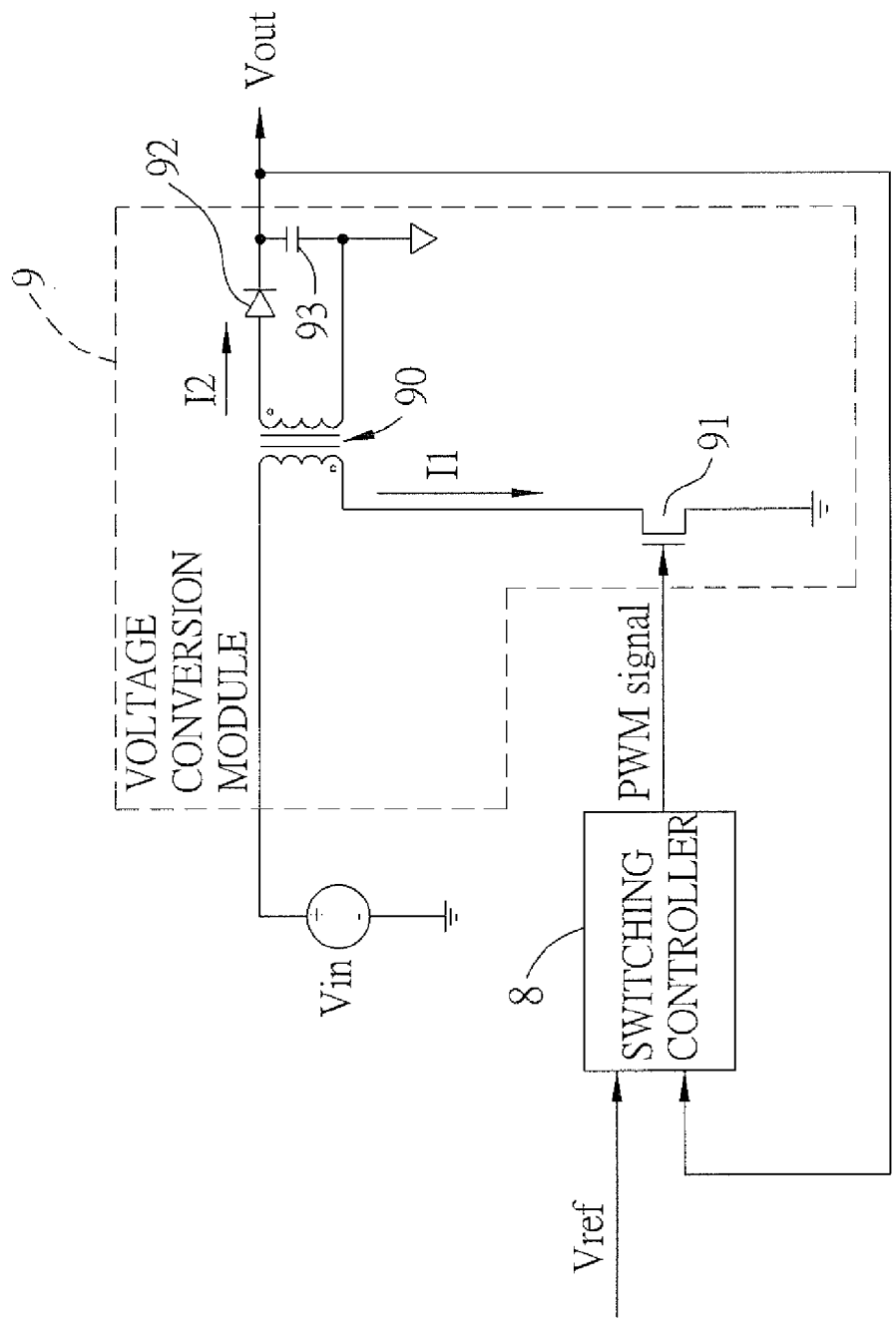
FIG. 1 is a schematic circuit block diagram illustrating a conventional flyback switching power converting apparatus.
Figure 2:
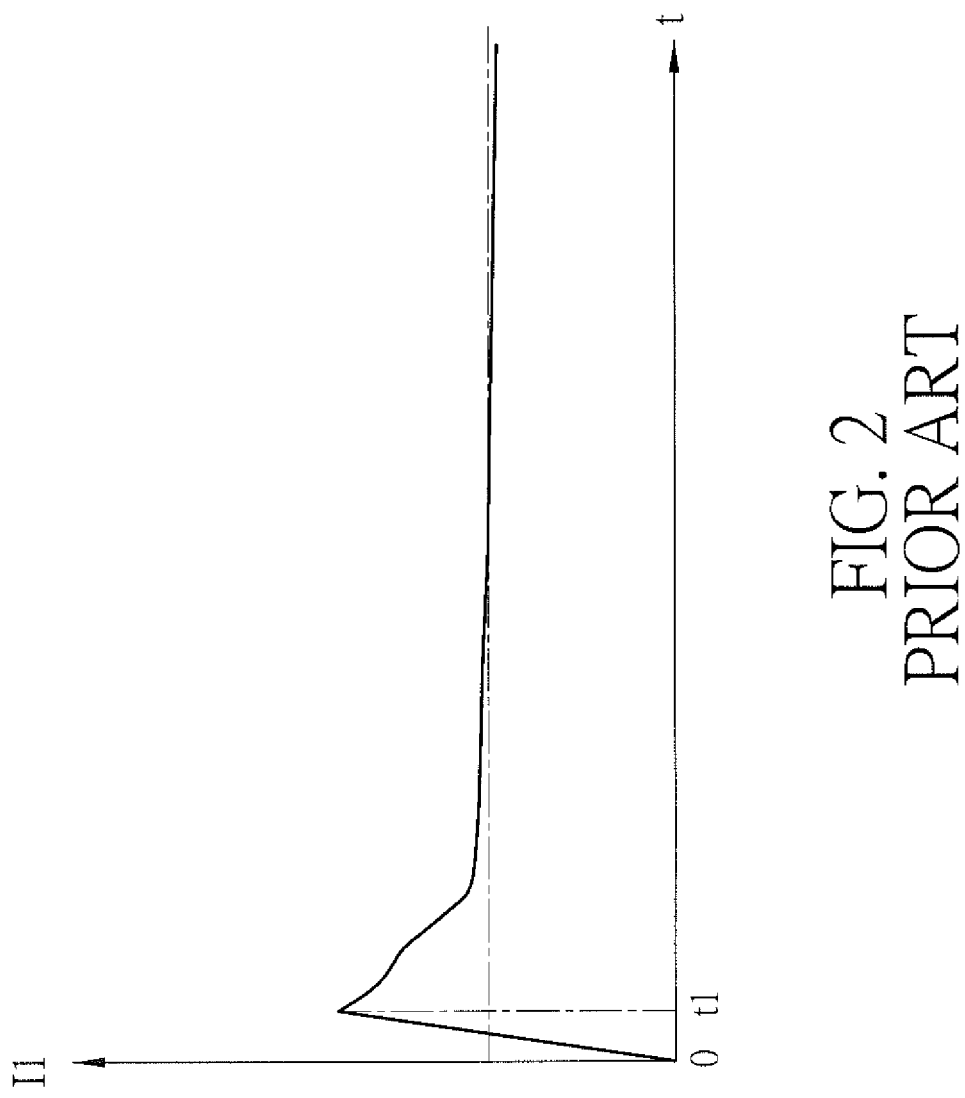
FIG. 2 is a plot illustrating a primary side current (I1) of a transformer of the conventional flyback switching power converting apparatus.

Before the present invention is described in greater detail, it should be noted that like elements are denoted by the same reference numerals throughout the disclosure.

Figure 3:
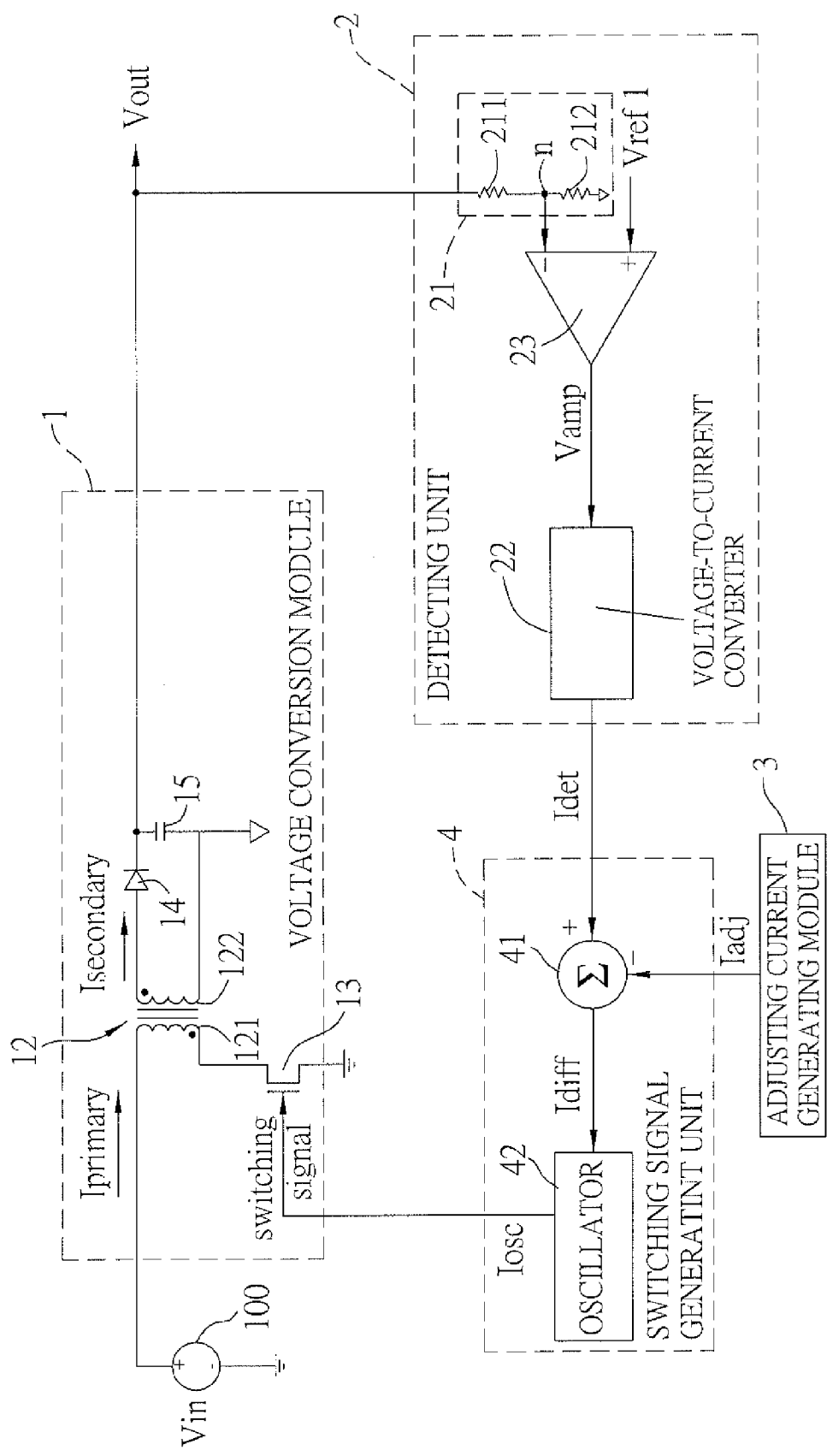
FIG. 3 is a schematic circuit block diagram illustrating the first preferred embodiment of a switching power converting apparatus according to the present invention.

Referring to FIG. 3, the first preferred embodiment of a switching power converting apparatus according to the present invention is shown to include a voltage conversion module 1, a detecting unit 2, an adjusting current generating module 3, and a switching signal generating unit 4.

The voltage conversion module 1 is, but not limited to, a flyback voltage converter. In this embodiment, the voltage conversion module 1 includes a transformer 12, a switch 13, a diode 14, and a capacitor 15. The transformer 12 includes a primary winding 121, and a first secondary winding 122. The primary winding 121 has an undotted end adapted to be coupled to a power source 100 for receiving an input voltage (Vin) therefrom, and a dotted end. The first secondary winding 122 has a dotted end, and a grounded undotted end. The switch 13, for example a transistor, is coupled between the dotted end of the primary winding 121 and ground, and is operable between an ON-state and an OFF-state in response to a switching signal. The diode 14 has an anode coupled to the dotted end of the first secondary winding 122, and a cathode. The capacitor 15 is coupled between the cathode of the diode 14 and the undotted end of the first secondary winding 122. The voltage conversion module 1 is operable to generate a primary side current (Iprimary) flowing through the primary winding 121 and a secondary side current (Isecondary) flowing through the first secondary winding 122 based on the switching signal so as to output an output voltage (Vout) across the capacitor 15. The output voltage (Vout) is associated with the secondary side current (Isecondary). The secondary side current (Isecondary) flows through the diode 14, and serves as a charging current to charge the capacitor 15.

The detecting unit 2 is coupled to the voltage conversion module 1 for receiving the output voltage (Vout) therefrom, and generates a detecting signal based on the output voltage (Vout) received thereby and a predetermined reference voltage (Vref1). In this embodiment, the detecting signal is a current signal, and has a current value that decreases with increase of the output voltage (Vout).

Figure 6A:
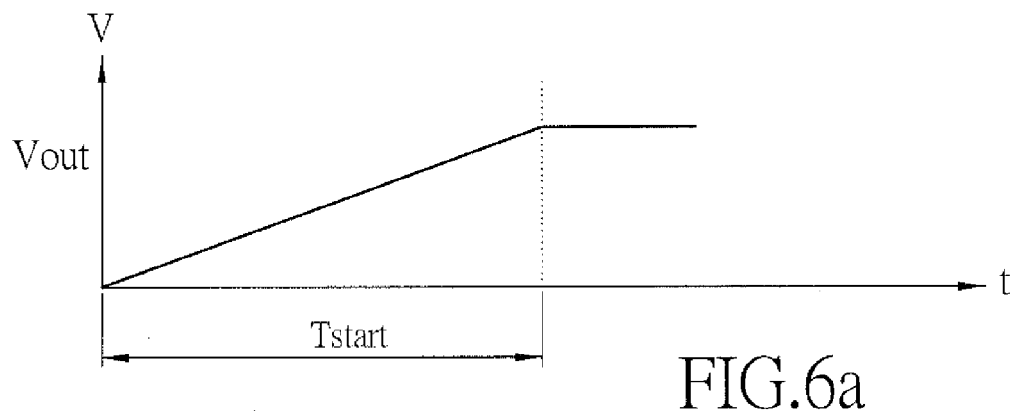
FIGS. 6a, 6b and 6c are plots illustrating an output voltage (Vout), a detecting current (Idet), and a primary side current (Iprimary) of the first preferred embodiment, respectively.
Figure 6B:
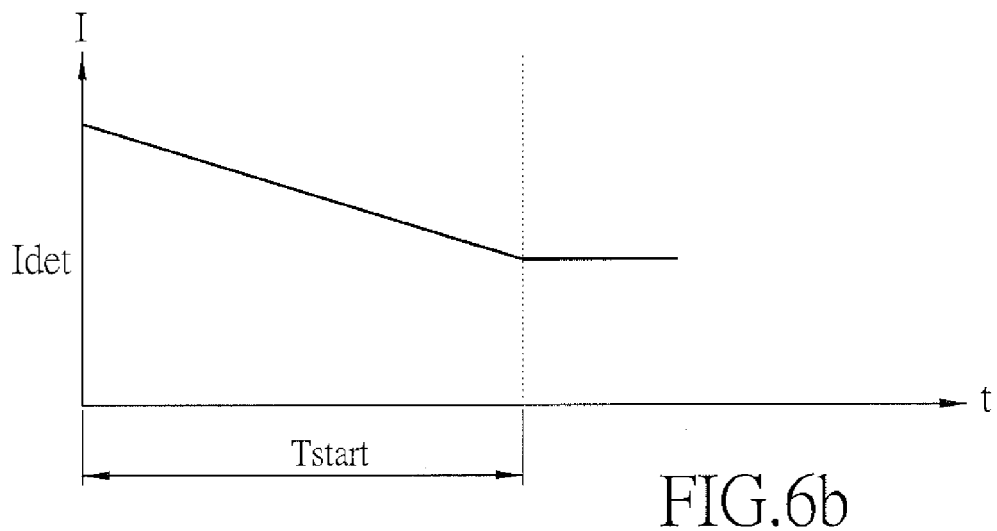

The detecting unit 2 includes a voltage divider 21, an operational amplifier 23, and a voltage-to-current converter 22. The voltage divider 21, which consists of two resistors 211, 212 coupled in series, is coupled to the capacitor 15 of the voltage conversion module 1 for receiving the output voltage (Vout), and divides the output voltage (Vout) so as to output a divided voltage of the output voltage (Vout) at a common node (n) between the resistors 211, 212. In this case, the divided voltage is regarded as a feedback voltage associated with the output voltage (Vout). The operational amplifier 23 has an inverting input end coupled to the common node (n) for receiving the divided voltage, a non-inverting input end adapted for receiving the predetermined reference voltage (Vref1), and an output end for outputting an amplified voltage (Vamp) associated with a difference between the predetermined reference voltage (Vref1) and the divided voltage. The voltage-to-current converter 22 is coupled to the output end of the operational amplifier 23 for receiving the amplified voltage (Vamp), and converts the amplified voltage (Vamp) into a detecting current (Idet) that serves as the detecting signal. It is noted that, referring to FIGS. 6a and 6b, the detecting current (Idet) has a current value that decreases with increase of the output voltage (Vout) during a start period (Tstart) of the switching power converting apparatus.

Figure 4:
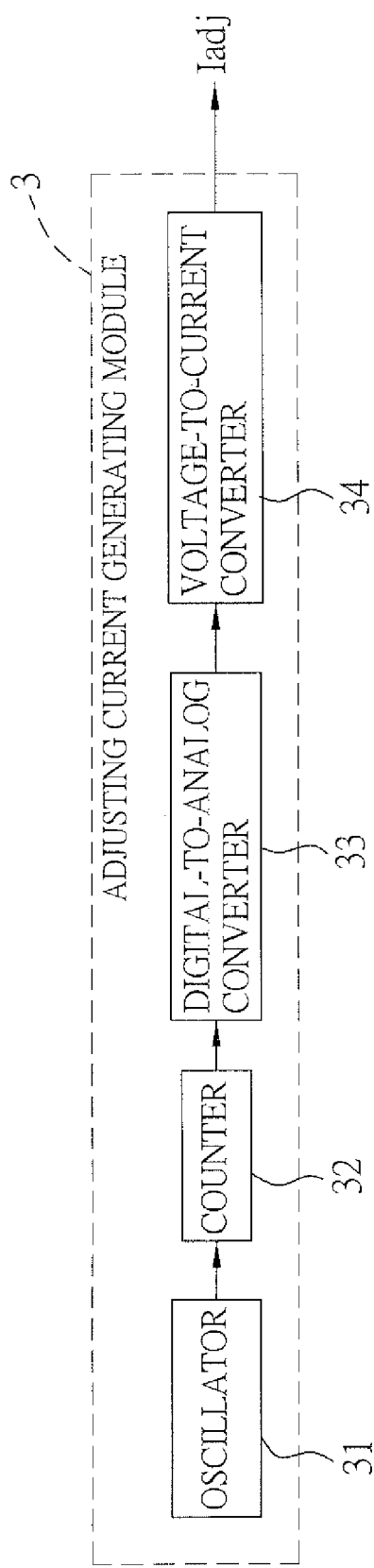
FIG. 4 is a schematic block diagram illustrating an adjusting current generating module of the first preferred embodiment.

The adjusting current generating module 3 is used to generate an adjusting current (Iadj) that serves as an adjusting signal. In this embodiment, the adjusting current (Iadj) is smaller than the detecting current (Idet), and is stepped down. Referring to FIG. 4, the adjusting current generating module 3 includes an oscillator 31, a counter 32, a digital-to-analog converter 33, and a voltage-to-current converter 34. The oscillator 31 is used to output an oscillating signal. The counter 32 is coupled to the oscillator 31 for receiving the oscillating signal therefrom. The counter 32 is loaded with a specified value (i), and starts counting down from the specified value (i) in response to successive pulses of the oscillating signal upon starting the switching power converting apparatus to output a counting signal that has a digital value equal to i-n×k after every k pulses, where i>n×k, and n=1, 2, 3, 4, . . . . The digital-to-analog converter 33 is coupled to the counter 32 for receiving the counting signal therefrom, and converts the counting signal into an analog voltage. The voltage-to-current converter 34 is coupled to the digital-to-analog converter 33 for receiving the analog voltage therefrom, and converts the analog voltage into an analog current that serves as the adjusting current (Iadj) and that is positively proportional to the analog voltage. Since the number (n) increases with time, the digital value of the counting signal decreases with increase of the number (n). Thus, the analog voltage and the analog current are stepped down. That is, the adjusting current (Iadj) is stepped down during the start period (Tstart) of the switching power converting apparatus.

The switching signal generating unit 4 is coupled to the detecting unit 2, the adjusting current generating module 3, and the voltage conversion module 1, and receives the detecting current (Idet) from the detecting unit 2 and the adjusting current (Iadj) from the adjusting current generating module 3. The switching signal generating unit 4 generates the switch-ing signal based on the detecting current (Idet) and the adjusting current (Iadj). In this embodiment, the switching signal generating unit 4 includes a subtractor 41 and an oscillator 42.

The subtractor 41 is coupled to the voltage-to-current converter 22 of the detecting unit 2 and the adjusting current generating module 3 for respectively receiving the detecting current (Idet) and the adjusting current (Iadj) therefrom. The subtractor 41 outputs a current difference (Idiff) between the detecting current (Idet) and the adjusting current (Iadj). It is noted that the current difference (Idiff) increases with time during the start period (Tstart).

Figure 5:
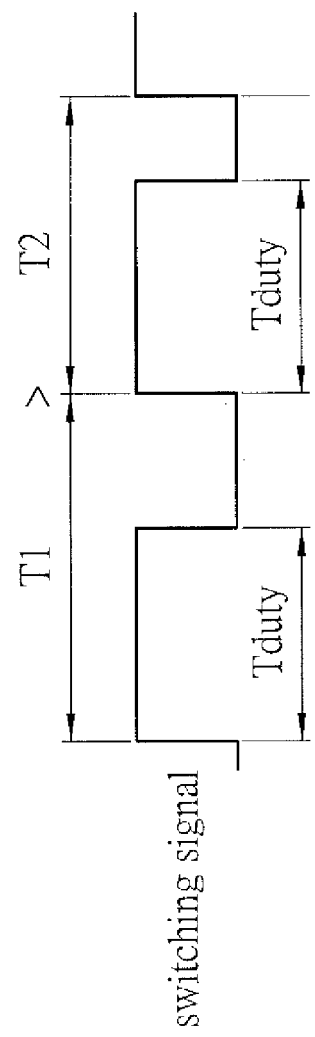
FIG. 5 is a plot illustrating a switching signal of the first preferred embodiment.

The oscillator 42 is coupled to the subtractor 41 and the switch 13 of the voltage conversion module 1, and receives the current difference (Idiff) between the detecting current (Idet) and the adjusting current (Iadj) from the subtractor 41. The oscillator 42 generates an oscillating signal (Iosc) serving as the switching signal based on the current difference (Idiff) between the detecting current (Idet) and the adjusting current (Iadj), and outputs the switching signal to the switch 13 of the voltage conversion module 1. In this embodiment, the switching signal is a pulse-frequency modulation (PFM) signal. The switching signal has a switching frequency (fsw) that increases with increase of the current difference (Idiff) during the start period (Tstart). Since the current difference (Idiff) increases with time during the start period (Tstart), the switching frequency (fsw) of the switching signal also increases with time during the same period. In this case, the switching signal has a switching cycle that decreases with increase of the current difference (Idiff) during the start period (Tstart). Similarly, the switching cycle of the switching signal decreases with time during the start period (Tstart). For example, referring to FIG. 5, a first switching cycle (T1) is greater than a second switching cycle (T2). In addition, the switching signal has a duty cycle that increases with increase of the current difference (Idiff). Similarly, the duty cycle of the switching signal increases with time. It is noted that the switching signal has the same duty-on period (Tduty) in each switching cycle, as shown in FIG. 5. In other words, during the start period (Tstart), the duty cycle of the switching signal initially is minimum, and then increases with time.

Figure 6C:
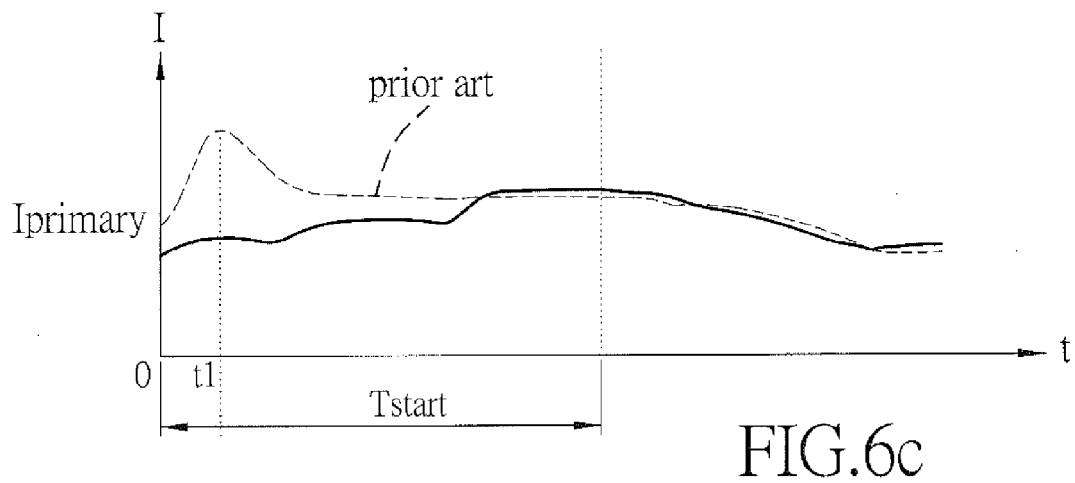

It is noted that, since the switch 13 initially has a shortest conduction period upon starting the switching power converting apparatus, as shown in FIG. 6c, during the start period (Tstart), an average current value of the primary side current (Iprimary) in each switching cycle initially is smallest and then gradually increases, thereby avoiding the occurrence of an inrush current at a time point (t1) of FIG. 6c encountered in the prior art. As a result, the secondary side current (Isecondary), similar to the primary side current (Iprimary), is gradually increased during the start period (Tstart). Therefore, the switching power converting apparatus of this invention is able to be soft-started to avoid the occurrence of an inrush current.

Figure 7:
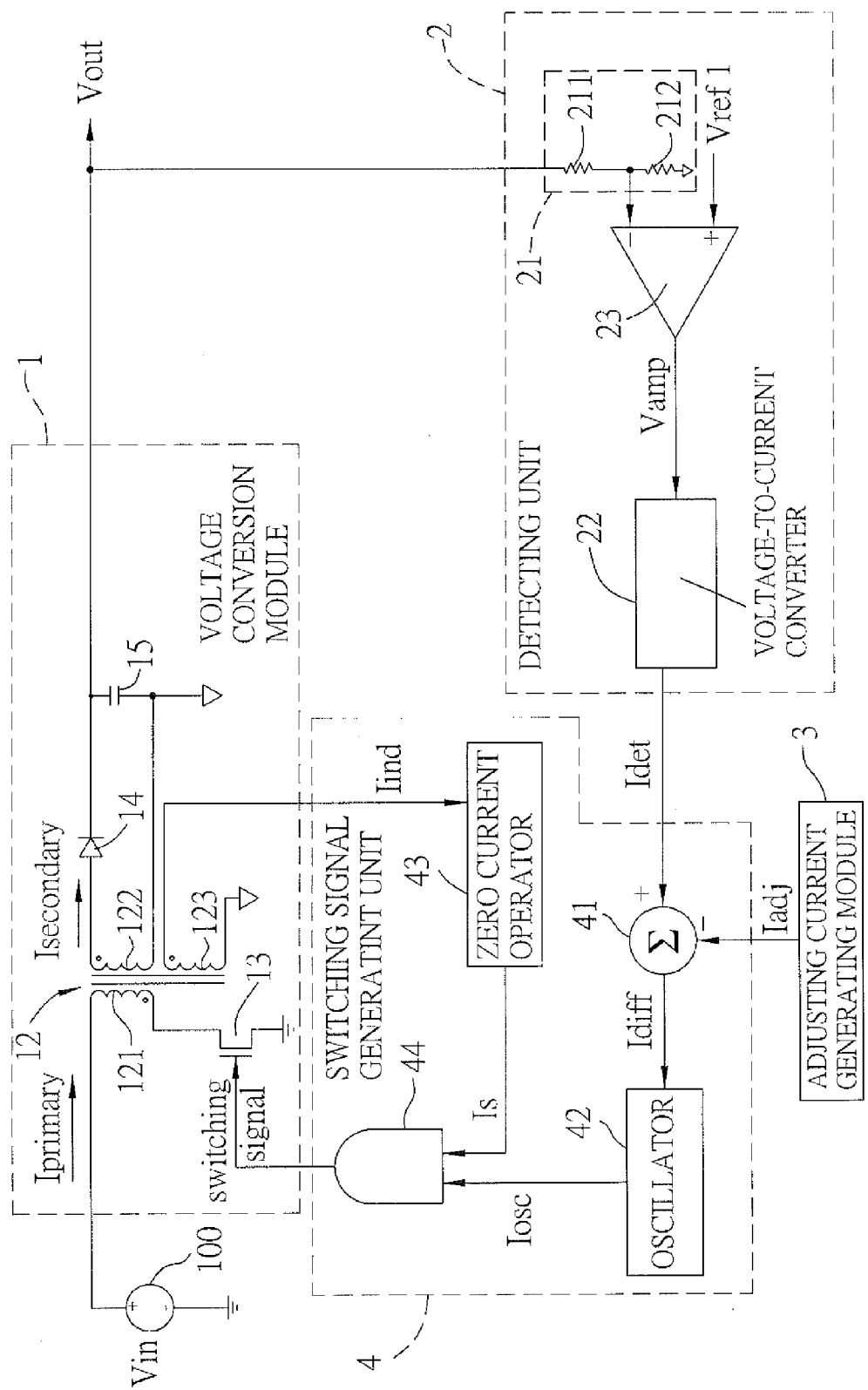
FIG. 7 is a schematic circuit block diagram illustrating the second preferred embodiment of a switching power converting apparatus according to the present invention.

FIG. 7 illustrates the second preferred embodiment of a switching power converting apparatus according to this invention, which is a modification of the first preferred embodiment. Unlike the previous embodiment, the transformer 12 of the voltage conversion module 1 further includes a second secondary winding 123 that is capable of generating an indicating current (Iind) for indicating the secondary side current (Isecondary).

In addition, the switching signal generating unit 4 further includes a zero current operator 43 and an AND gate 44. The zero current operator 43 is coupled to a dotted end of the second secondary winding 123 of the transformer 12 for receiving the indicating current (Iind) therefrom. The zero current operator 43 is operable to generate a sensing signal (Is) based on the indicating current (Iind). In detail, referring to FIGS. 8a and 8b, when the indicating current (Iind) indicates that the secondary side current (Isecondary) decreases from a predetermined current level to zero, the sensing signal (Is) has a logic low level. When the indicating current (Iind) indicates that the secondary side current (Isecondary) is kept at a zero level, the sensing signal (Is) has a logic high level.

The AND gate 44 is coupled to the oscillator 42 and the zero current operator 43 for receiving the oscillating signal (Iosc) and the sensing signal (Is) therefrom. The AND gate 44 is operable to output the switching signal based on the oscillating signal (Iosc) and the sensing signal (Is). Referring to FIGS. 8a to 8d, the switching signal does not become logic high until the secondary side current (Isecondary) decreases to zero. In other words, the switch 13 of the voltage conversion module 1 does not conduct in response to the switching signal until the secondary side current (Isecondary) decreases to zero. Therefore, in this embodiment, the voltage conversion module 1 can effectively operate in a discontinuous inductor current mode to ensure stabilization of the output voltage (Vout).

Figure 9:
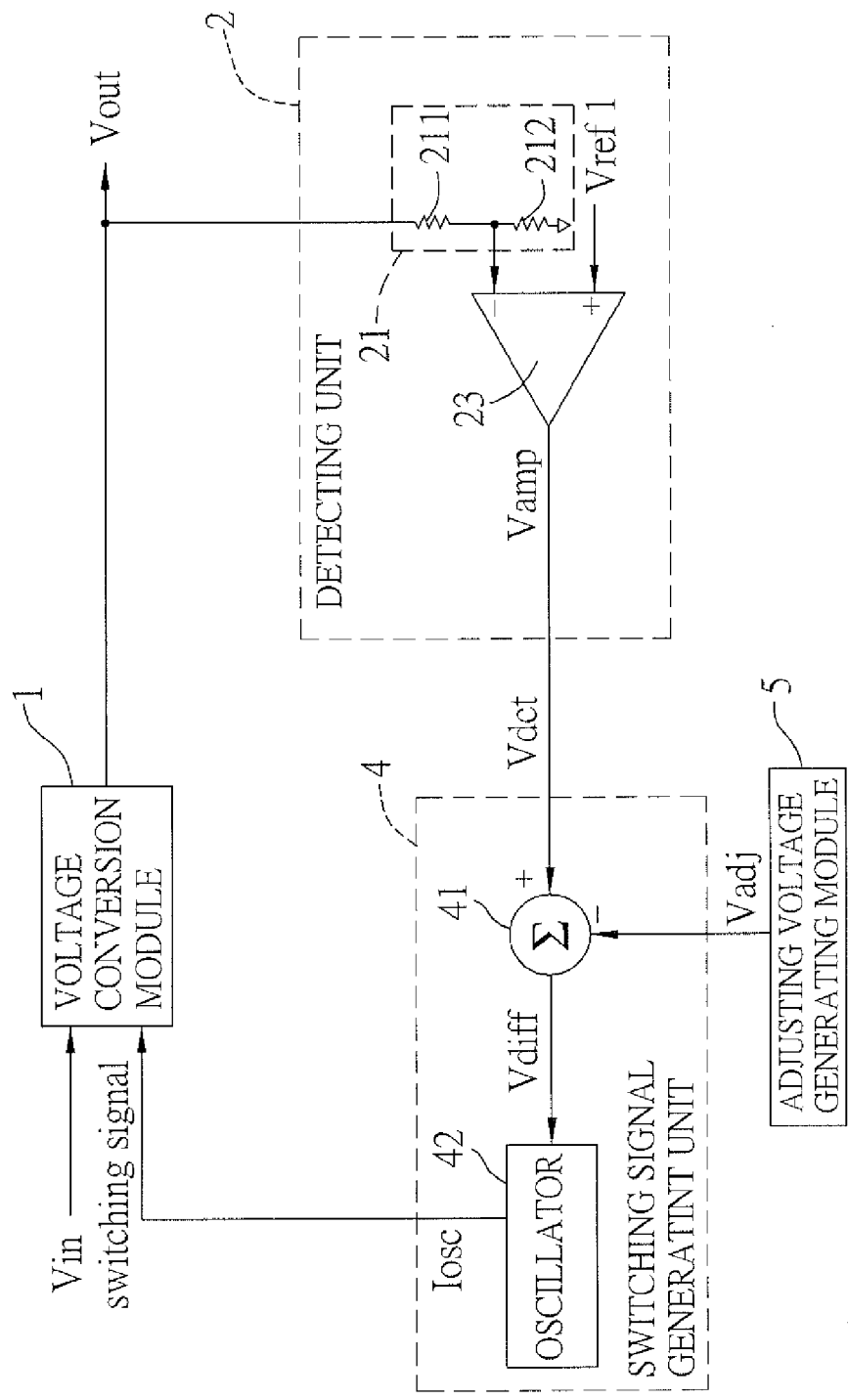
FIG. 9 is a schematic circuit block diagram illustrating the third preferred embodiment of a switching power converting apparatus according to the present invention.

FIG. 9 illustrates the third preferred embodiment of a switching power converting apparatus according to this invention, which is a modification of the first preferred embodiment. Unlike the first preferred embodiment, the detecting unit 2 is used to generate a detecting voltage (Vdet) based on the output voltage (Vout) and the predetermined reference voltage (Vref1). The detecting voltage (Vdet) serves as the detecting signal. In this embodiment, the detecting unit 2 merely has the voltage divider 21 and the operational amplifier 23. The amplified voltage (Vamp) outputted by the operational amplifier 23 serves as the detecting voltage (Vdet). Similar to the detecting current (Idet) in the first preferred embodiment, the detecting voltage (Vdet) decreases with increase of the output voltage (Vout).

Furthermore, in this embodiment, the adjusting signal is an adjusting voltage. As such, an adjusting voltage generating module 5 is used to replace the adjusting current generating module 3 of the first preferred embodiment (FIG. 3). The adjusting voltage generating module 5 generates the adjusting voltage (Vadj) in a manner similar to that for generating the adjusting current (Iadj) in the first preferred embodiment. The adjusting voltage generating module 5 can consist of the oscillator 31, the counter 32 and the digital-to-analog converter 33 shown in FIG. 4. Therefore, the adjusting voltage (Vadj), similar to the adjusting current (Iadj), is stepped down during the start period of the switching power converting apparatus.

In addition, the subtractor 41 of the switching signal generating unit 4 outputs a voltage difference (Vdiff) between the detecting voltage (Vdet) and the adjusting voltage (Vadj). Similar to the current difference (Idiff) in the first preferred embodiment, the voltage difference (Vdiff) increases with time during the start period. The oscillator 42 of the switching signal generating unit 4 generates the oscillating signal (Iosc) serving as the switching signal based on the voltage difference (Vdiff).

Figure 10:
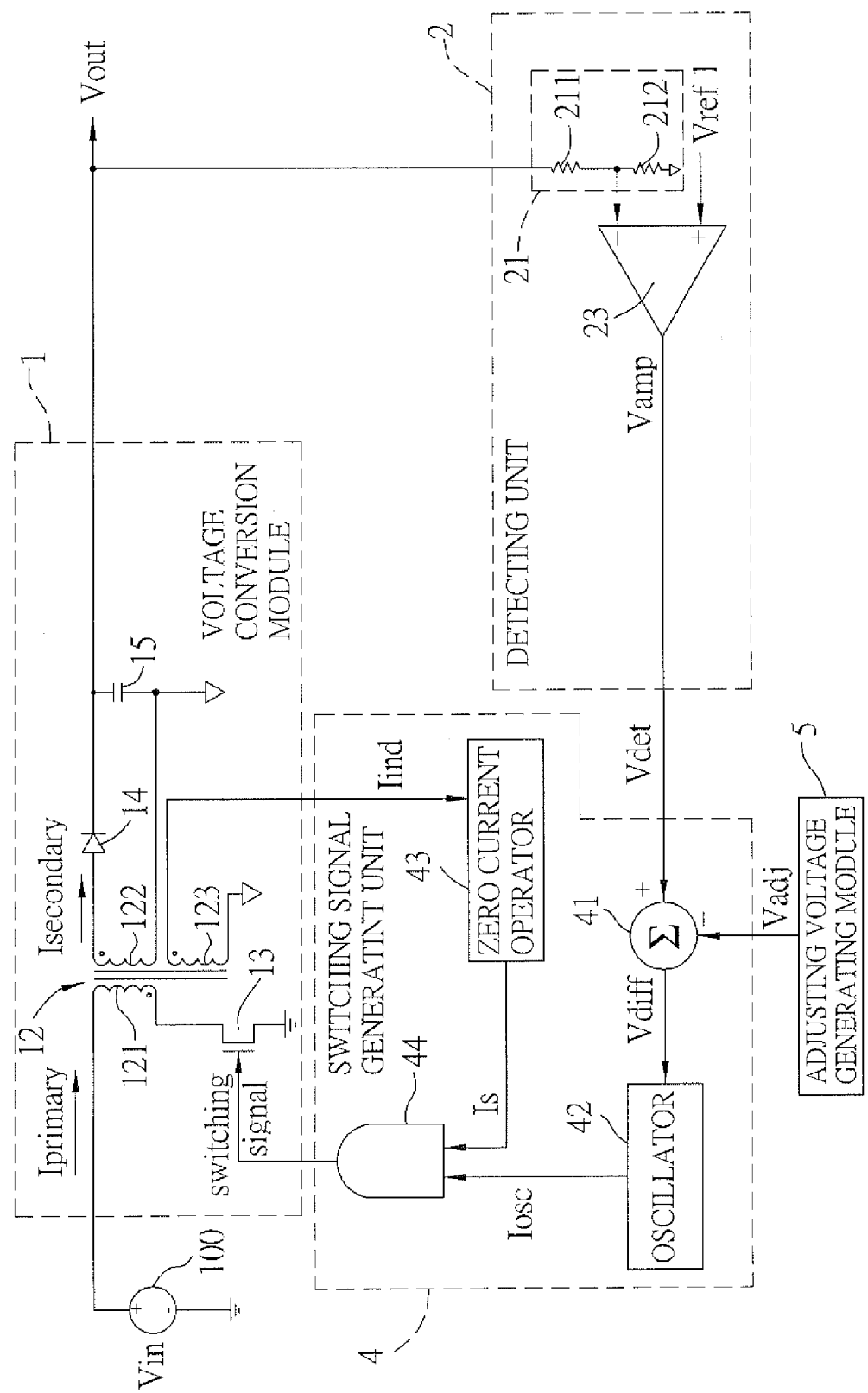
FIG. 10 is a schematic circuit block diagram illustrating the fourth preferred embodiment of a switching power converting apparatus according to the present invention.

FIG. 10 illustrates the fourth preferred embodiment of a switching power converting apparatus according to this invention, which is a modification of the second preferred embodiment. Unlike the second preferred embodiment, the detecting unit 2, similar to the detecting unit 2 of the third preferred embodiment (FIG. 9), is used to generate a detecting voltage (Vdet) based on the output voltage (Vout) and the predetermined reference voltage (Vref1). The detecting voltage (Vdet) serves as the detecting signal. Therefore, the amplified voltage (Vamp) outputted by the operational amplifier 23 serves as the detecting voltage (Vdet), and the detecting voltage (Vdec) decreases with increase of the output voltage (Vout).

Furthermore, the adjusting signal is an adjusting voltage. As such, an adjusting voltage generating module 5, similar to the adjusting voltage generating module 5 of the third preferred embodiment (FIG. 9), is used to replace the adjusting current generating module 3 of the secondpreferred embodiment (FIG. 7). Therefore, the adjusting voltage (Vadj) generated by the adjusting voltage generating module 5 is stepped down during the start period.

In addition, the subtractor 41 of the switching signal generating unit 4, similar to the substrator 41 of the third preferred embodiment, outputs a voltage difference (Vdiff) between the detecting voltage (Vdet) and the adjusting voltage (Vadj). Thus, the voltage difference (Vdiff) increases with time during the start period. The oscillator 42 of the switching signal generating unit 4 generates the oscillating signal (Iosc) based on the voltage difference (Vdiff).

Figure 11:
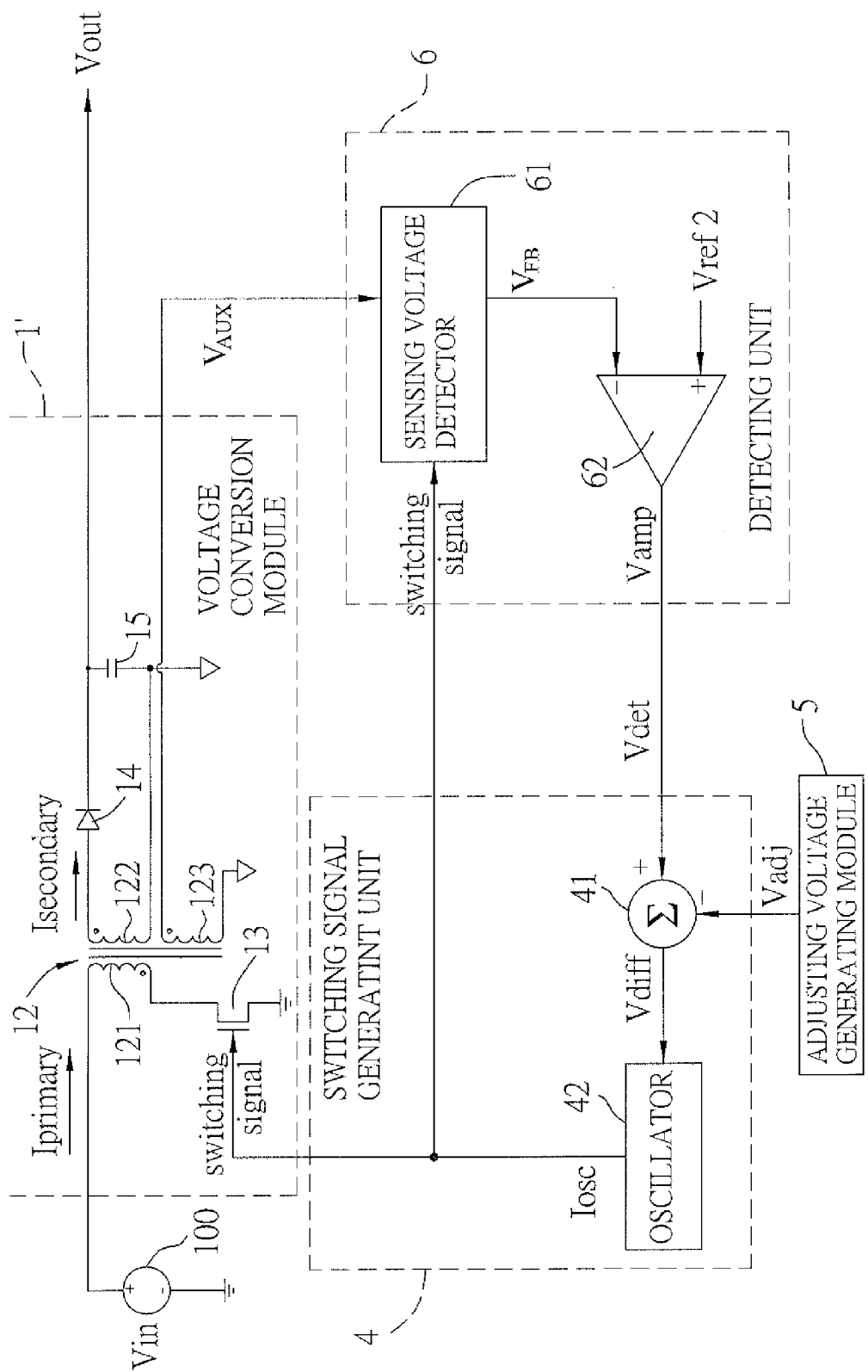
FIG. 11 is a schematic circuit block diagram illustrating the fifth preferred embodiment of a switching power converting apparatus according to the present invention.
Figure 12:
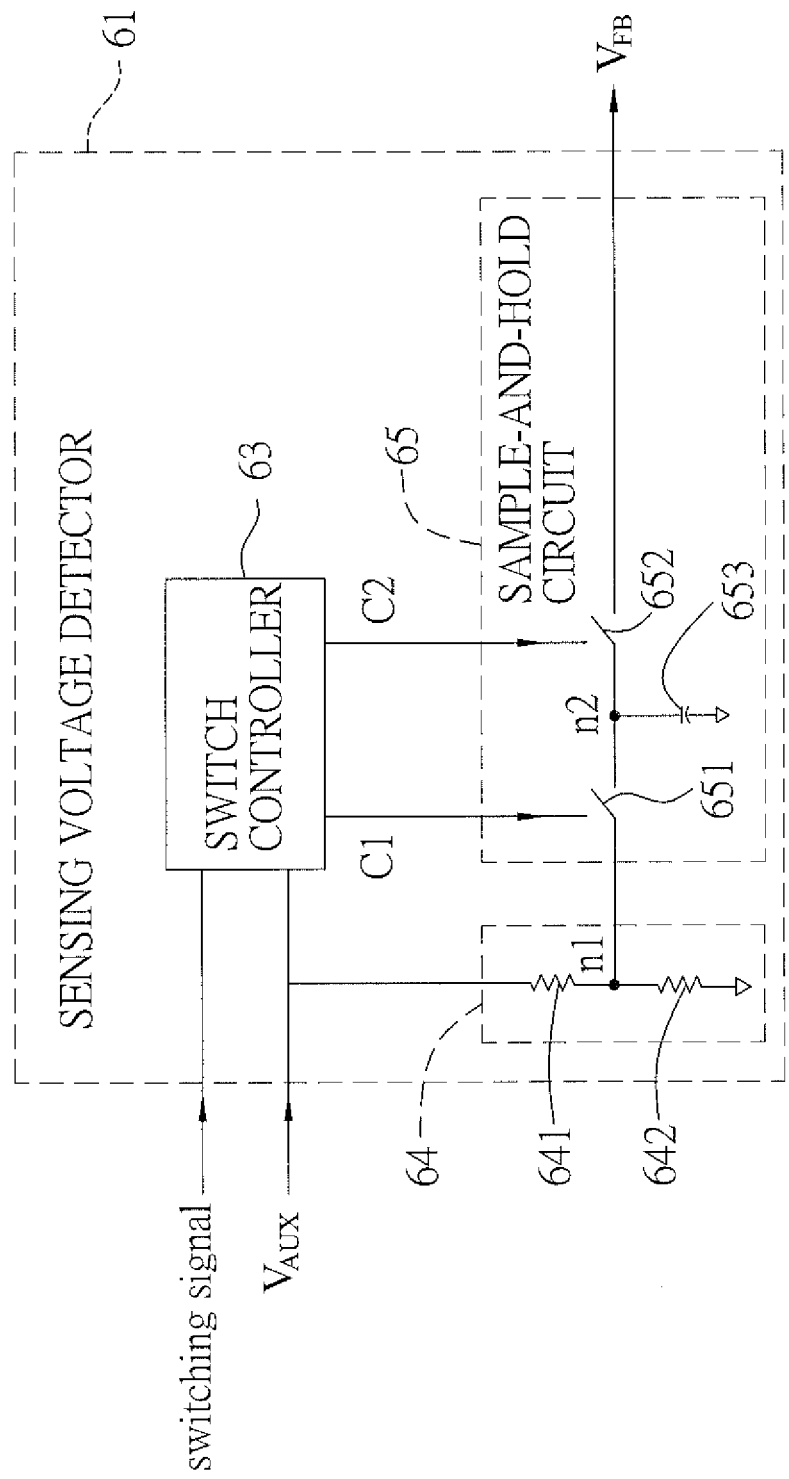
FIG. 12 is a schematic circuit block diagram illustrating a sensing voltage detector of a detecting unit of the fifth preferred embodiment.

FIG. 11 illustrates the fifth preferred embodiment of a switching power converting apparatus according to this invention, which is a modification of the third preferred embodiment. Unlike the third preferred embodiment, the voltage conversion module 1' has the same configuration as that of the voltage conversion module 1 of the second preferred embodiment (FIG. 7). It is noted that the voltage conversion module 1' generates a sensing voltage ($V_{AUX}$) across the second secondary winding 123. The sensing voltage ($V_{AUX}$) is associated with a winding turns ratio of the first secondary winding 122 to the second secondary winding 123, and the output voltage (Vout).

Figure 13:
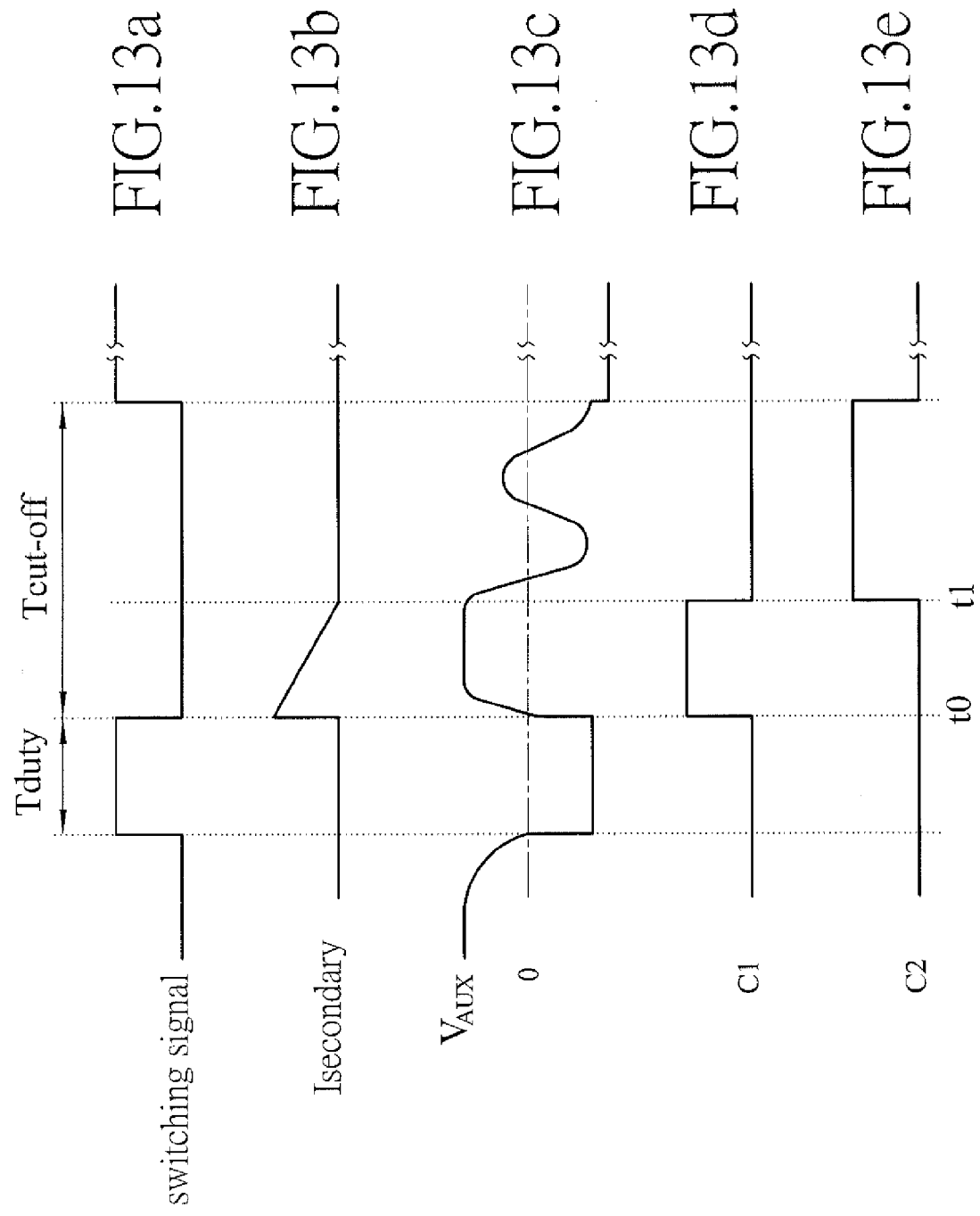
FIGS. 13a to 13e are plots illustrating a switching signal, a secondary side current (Isecondary), a sensing voltage ($V_{AUX}$), a first control signal (C1), and a second control signal (C2) of the fifth preferred embodiment, respectively.

More specifically, referring further to FIGS. 13a to 13c, when the switching signal becomes logic low from logic high at time (t0), i.e., the switch 13 becomes non-conducting, the secondary side current (Isecondary) induced by the first secondary winding 122 begins to charge the capacitor 15. Therefore, the sensing voltage ($V_{AUX}$) can be obtained based on the following Equation 1:

$$V_{AUX} = (Vout|V_F) \times (N_{AUX}/N_S)$$ Equation 1 where $V_F$ is a forward conduction voltage of the diode 14, $N_S$ is the number of turns of the first secondary winding 122, $N_{AUX}$ is the number of turns of the second secondary winding 123, and $N_{AUX}/N_S$ is the winding turns ratio of the first secondary winding 122 to the second secondary winding 123. When the switch 13 non-conducts, the secondary side current (Isecondary) begins to gradually decrease to zero (see FIG. 13b). When the secondary side current (Isecondary) becomes zero at a time point (t1), the diode 14 non-conducts such that $V_F = 0$. By introducing $V_F = 0$, Equation 1 is simplified to the following Equation 2:

$$V_{AUX} = Vout \times (N_{AUX}/N_S)$$ Equation 2

It is known from Equation 2 that, at the time point (t1), the sensing voltage ($V_{AUX}$) is proportional to the output voltage (Vout). On the other hand, the sensing voltage ($V_{AUX}$) is maximum at a period between the time points (t0) and (t1), and then begins to decrease (see FIG. 13c) after the time point (t1).

Furthermore, the detecting unit 6 is coupled to the voltage conversion module 1' for receiving the sensing voltage ($V_{AUX}$) therefrom, and generates a detecting signal based on the sensing voltage ($V_{AUX}$), the switching signal and a predetermined reference voltage (Vre2). In this embodiment, the detecting signal is a voltage signal. The detecting unit 6 includes a sensing voltage detector 61 and an operational amplifier 62. The sensing voltage detector 61 is coupled to the dotted end of the second secondary winding 123 of the transformer 12 of the voltage conversion module 1', and receives the sensing voltage ($V_{AUX}$) from the second secondary winding 123 and the switching signal. The sensing voltage detector 61 is operable to generate a feedback voltage ($V_{FB}$), which is associated with the output voltage (Vout), based on the switching signal and the sensing voltage ($V_{AUX}$).

Referring further to FIGS. 12, 13a, and 13c to 13e, the sensing voltage detector 61 includes a switch controller 63, a voltage divider 64, and a sample-and-hold circuit 65. The switch controller 63 receives the switching signal and the sensing voltage ($V_{AUX}$), and is operable to generate, based on the switching signal and the sensing voltage ($V_{AUX}$), first and second control signals (C1, C2) that are complementary to each other during a cut-off period (Tcut-off) of the switching signal (see FIGS. 13a, 13d and 13e). The first control signal (C1) switches from a logic low level to a logic high level when the sensing voltage ($V_{AUX}$) begins to increase from a minimum voltage value, and switches from the logic high level to the logic low level when the sensing voltage ($V_{AUX}$) begins to decrease from a maximum voltage value (see FIGS. 13c and 13d). The voltage divider 64, which consists of two resistors 641, 642 coupled in series, receives the sensing voltage ($V_{AUX}$) and divides the sensing voltage ($V_{AUX}$) so as to output a divided voltage of the sensing voltage ($V_{AUX}$) at a common node (n1) between the resistors 641, 642. The sample-and-hold circuit 65 is coupled to the switch controller 63 and the voltage divider 64, and receives the first and second control signals (C1, C2) from the switch controller 63, and the divided voltage from the voltage divider 64. The sample-and-hold circuit 65 is operable to sample the divided voltage based on the first control signal (C1) so as to obtain a sampling voltage, and output the sampling voltage serving as the feedback voltage ($V_{FB}$) based on the second control signal (C2). The sample-and-hold circuit 65 includes a series connection of a sampling switch 651 and a capacitor 653, and a holding switch 652. The sampling switch 651 is coupled to the common node (n1) of the voltage divider 64, and is controlled by the first control signal (C1) from the switch controller 63 to switch between an ON-state and an OFF-state. The capacitor 653 has a grounded terminal, and is charged by the divided voltage when the sampling switch 651 is in the ON-state. A voltage across the capacitor 653 serves as the sampling voltage. The sampling voltage is equal to the divided voltage after the sampling switch 651 has been in the ON-state for a sufficient amount of time and the capacitor 653 is fully charged, and is smaller than the divided voltage when otherwise. The holding switch 652 is coupled between an inverting input end of the operational amplifier 62 and a common node (n2) between the sampling switch 651 and the capacitor 653. The holding switch 652 is controlled by the second control signal (C2) to switch between an ON-state and an OFF-state. When the sampling and holding switches 651, 652 are respectively in the OFF-state and the ON-state, the sampling voltage is outputted through the holding switch 652 as the feedback voltage ($V_{FB}$).

The inverting input end of the operational amplifier 62 is coupled to the sensing voltage detector 61 for receiving the feedback voltage ($V_{FB}$) therefrom, and the operational amplifier 62 further has a non-inverting input end for receiving the predetermined reference voltage (Vref2), and an output end for outputting an amplified voltage (Vamp) associated with a difference between the predetermined reference voltage (Vref2) and the feedback voltage ($V_{FB}$). In this embodiment, similar to the third preferred embodiment of FIG. 9, the detecting signal is the amplified voltage (Vamp), i.e., the detecting voltage (Vdet), and decreases with increase of the output voltage (Vout).

Figure 14:
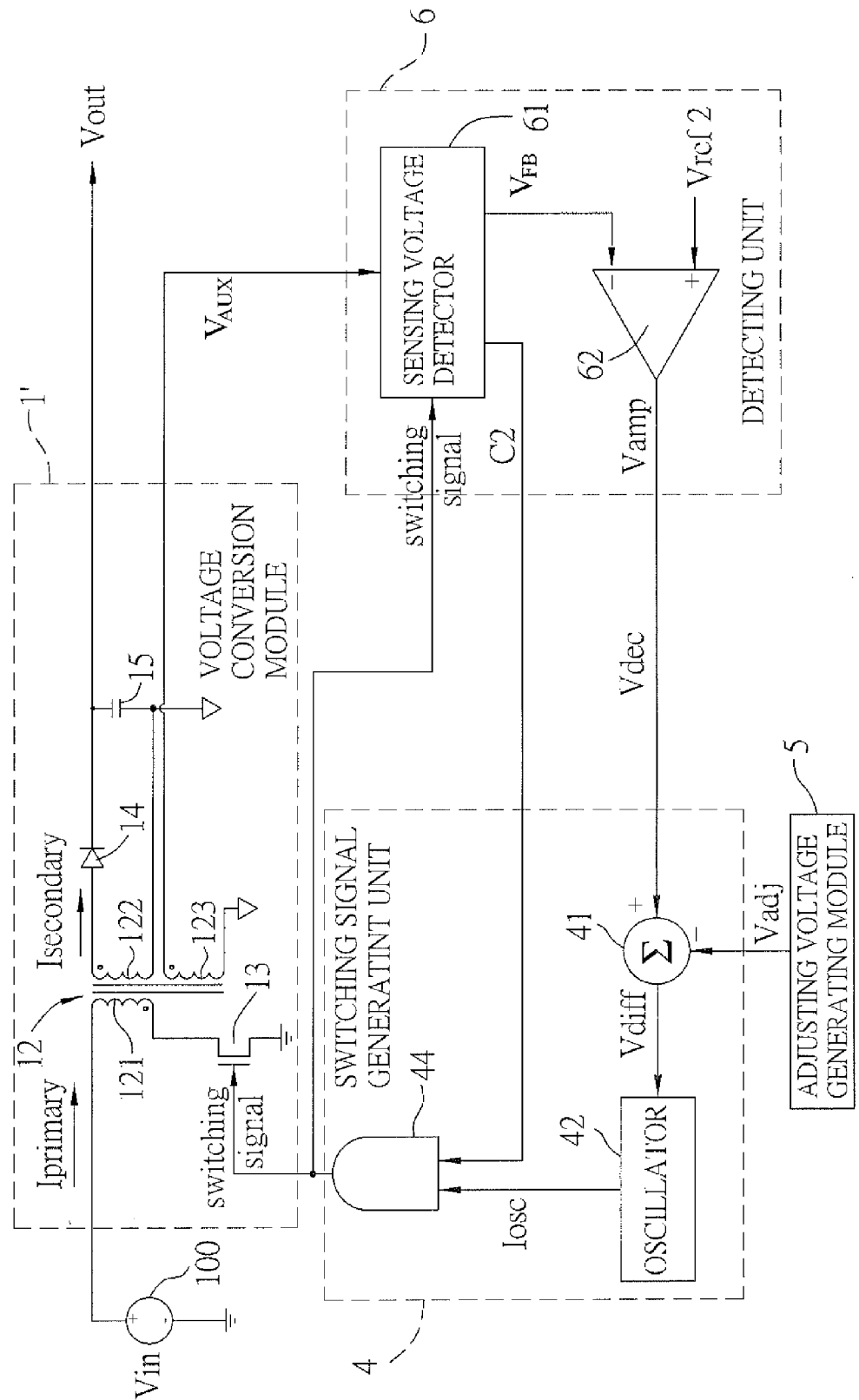
FIG. 14 is a schematic circuit block diagram illustrating the sixth preferred embodiment of a switching power converting apparatus according to the present invention.

FIG. 14 illustrates the sixth preferred embodiment of a switching power converting apparatus according to this invention, which is a modification of the fifth preferred embodiment.

In this embodiment, the oscillator 42 of the switching signal generating unit 4 generates, based on the voltage difference (Vdiff) from the subtractor 41, the oscillating signal (Iosc), which is identical to the oscillating signal (Iosc) of the fifth preferred embodiment.

In addition, the switching signal generating unit 4 further includes an AND gate 44. The AND gate 44 is coupled to the oscillator 42 and the sensing voltage detector 61 of the detecting unit 6 for receiving respectively the oscillating signal (Iosc) and the second control signal (C2) therefrom. The AND gate 44 is operable to output the switching signal based on the oscillating signal (Iosc) and the second control signal (C2).

Figure 15:
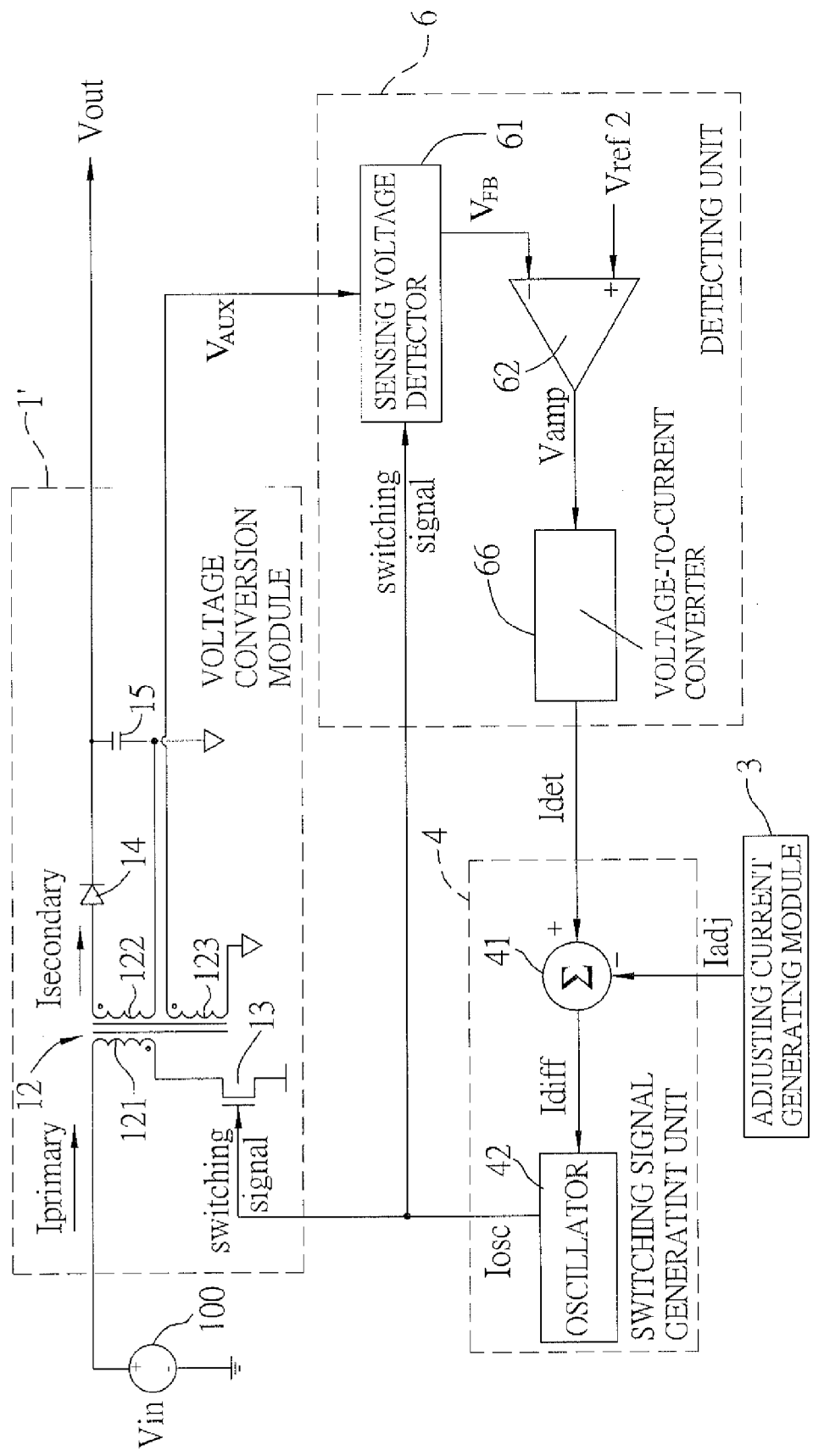
FIG. 15 is a schematic circuit block diagram illustrating the seventh preferred embodiment of a switching power converting apparatus according to the present invention.

FIG. 15 illustrates the seventh preferred embodiment of a switching power converting apparatus according to this invention, which is a modification of the fifth preferred embodiment. Unlike the fifth preferred embodiment, the detecting unit 6 further includes a voltage-to-current converter 66 identical to the voltage-to-current converter 22 of the first preferred embodiment (see FIG. 3). The voltage-to-current converter 66 is coupled between the output end of the operational amplifier 62 and the subtractor 41 of the switching signal generating unit 4, and receives the amplified voltage (Vamp) from the output end of the operational amplifier 62. The voltage-to-current converter 66 converts the amplified voltage (Vamp) into a detecting current (Idet) that serves as the detecting signal and that decreases with increase of the output voltage (Vout), and outputs the detecting current (Idet) to the subtractor 41 of the switching signal generating unit 4.

Furthermore, in this embodiment, the adjusting signal is an adjusting current. As such, instead of the adjusting voltage generating module 5 of the fifth preferred embodiment (FIG. 11), the adjusting current generating module 3 of the first preferred embodiment is used in this embodiment. The adjusting current generating module generates the adjusting current (Iadj), and outputs the adjusting current (Iadj) to the subtractor 41 of the switching signal generating unit 4.

Therefore, for the switching signal generating unit 4, the subtractor 41 outputs a current difference (Idiff) between the detecting current (Idet) and the adjusting current (Iadj) to the oscillator 42. The oscillator 42 generates the oscillating signal (Iosc) serving as the switching signal based on the current difference (Idiff) between the detecting current (Idet) and the adjusting current (Iadj).

Figure 16:
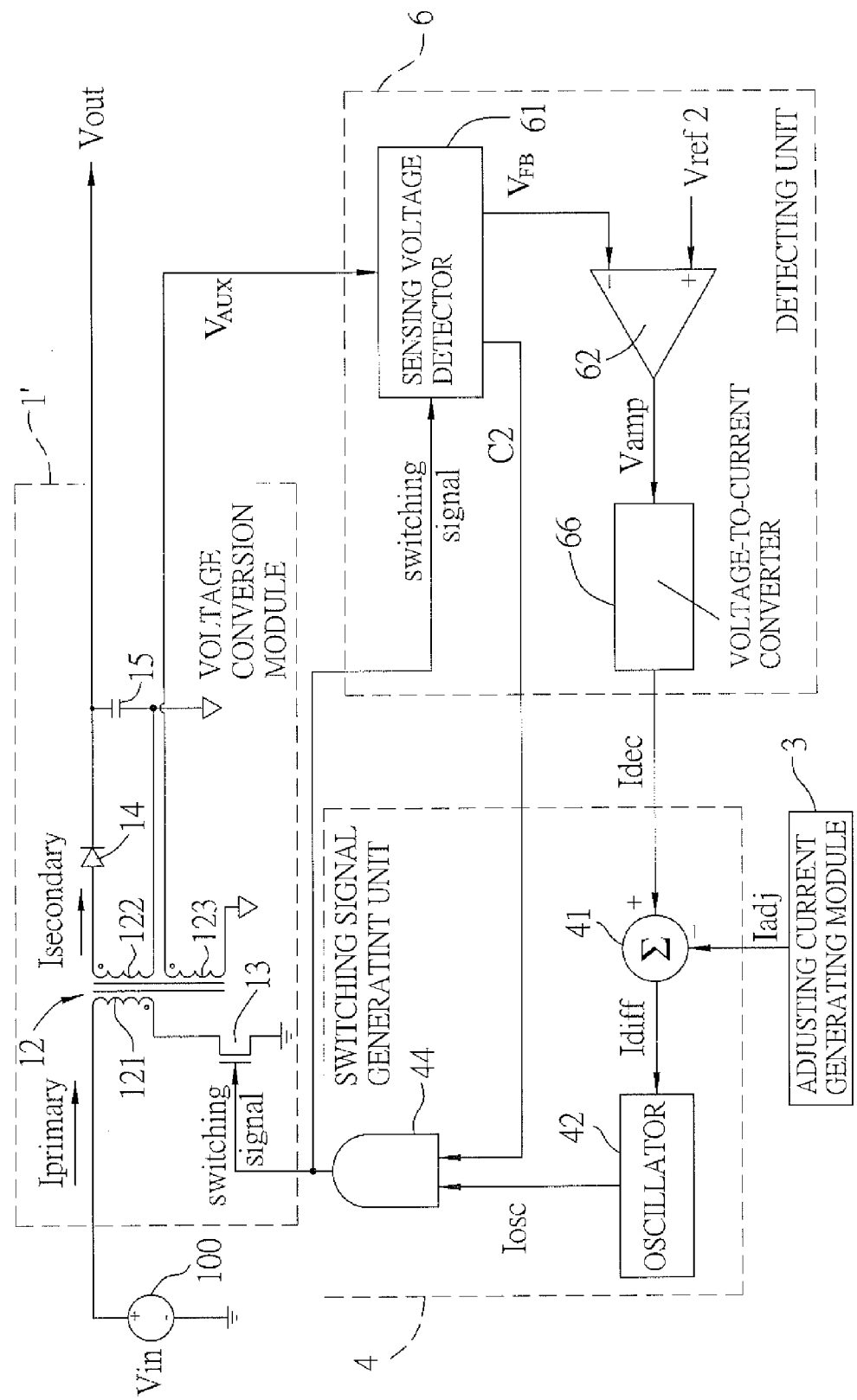
FIG. 16 is a schematic circuit block diagram illustrating the eighth preferred embodiment of a switching power converting apparatus according to the present invention.

FIG. 16 illustrates the eighth preferred embodiment of a switching power converting apparatus according to this invention, which is a modification of the seventh preferred embodiment.

In this embodiment, the oscillator 42 of the switching signal generating unit 4 generates, based on the current difference (Idiff) from the subtractor 41, an oscillating signal (Iosc), which is identical to the oscillating signal (Iosc) in the seventh preferred embodiment.

In addition, the switching signal generating unit 4 further includes an AND gate 44. The AND gate 44 is coupled to the oscillator 42 and the sensing voltage detector 61 of the detecting unit 6 for receiving respectively the oscillating signal (Iosc) and the second control signal (C2) therefrom. The AND gate 44 is operable to output the switching signal based on the oscillating signal (Iosc) and the second control signal (C2).

To sum up, due to the adjusting signal generated by the adjusting current generating module 3 or the adjusting voltage generating module 5, the switching power converting apparatus of the present invention can provide a soft-start function to effectively avoid the occurrence of an inrush current encountered in the prior art during the start period. Moreover, since the voltage conversion module 1 can be effectively operated in the discontinuous inductor current mode, the switching power converting apparatus of the present invention can ensure stabilization of the output voltage (Vout).

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. The switching power converting apparatus comprising:
   a voltage conversion module including a transformer,
   said transformer includes a primary winding adapted to receive an input voltage, and a first secondary winding,
   wherein said voltage conversion module is operable to generate a secondary side current flowing through said first secondary winding of said transformer based on a switching signal having a switching frequency, and
   to output an output voltage associated with the secondary side current;
   a detecting unit coupled to said voltage conversion module for receiving the output voltage therefrom, and
   operable to generate a detecting signal based on the output voltage received thereby and a predetermined reference voltage; and
   a switching signal generating unit coupled to said detecting unit and said voltage conversion module, and
   receiving the detecting signal from said detecting unit and an adjusting signal, said switching signal generating unit being operable to generate the switching signal based at least on the detecting signal and the adjusting signal so that the secondary side current is gradually increased during a start period of said switching power converting apparatus;
   wherein:
   each of the detecting signal and the adjusting signal is a current signal;
   the detecting signal has a current value that decreases with increase of the output voltage; and
   during the start period, the switching signal has a switching frequency that increases with increase of a current difference between the detecting signal and the adjusting signal, and a duty cycle that increases with increase of the current difference between the detecting signal and the adjusting signal.

2. The switching power converting apparatus as claimed in claim 1, wherein said voltage conversion module further includes:
   a switch coupled between a dotted end of said primary winding of said transformer and ground, and operable between an ON-state and an OFF-state in response to the switching signal;
   a diode having an anode coupled to a dotted end of said first secondary winding of said transformer, and a cathode; and a capacitor coupled between said cathode of said diode and ground, a voltage across said capacitor serving as said output voltage.

3. The switching power converting apparatus as claimed in claim 1, wherein said detecting unit includes:
   a voltage divider coupled to said voltage conversion module for receiving the output voltage therefrom, and operable to divide the output voltage so as to output a divided voltage of the output voltage;
   an operational amplifier having an inverting input end coupled to said voltage divider for receiving the divided voltage therefrom, a non-inverting input end adapted for receiving the predetermined reference voltage, and an output end for outputting an amplified voltage associated with a difference between the predetermined reference voltage and the divided voltage;
   and a voltage-to-current converter coupled to said output end of said operational amplifier for receiving the amplified voltage, and operable to convert the amplified voltage into a detecting current that serves as the detecting signal.

4. The switching power converting apparatus as claimed in claim 3, wherein said switching signal generating unit includes:
   a subtractor coupled to said voltage-to-current converter of said detecting unit, and receiving the detecting signal from said voltage-to-current converter of said detecting unit and the adjusting signal, said subtractor being operable to output the current difference between the detecting signal and the adjusting signal, the current difference between the detecting signal and the adjusting signal increasing with time during the start period; and
   an oscillator coupled to said subtractor for receiving the current difference between the detecting signal and the adjusting signal therefrom, and operable to generate the switching signal based on the current difference between the detecting signal and the adjusting signal.

5. The switching power converting apparatus as claimed in claim 4, further comprising an adjusting current generating module coupled to said subtractor of said switching signal generating unit for generating an adjusting current that is stepped down during the start period and that serves as the adjusting signal.

6. The switching power converting apparatus as claimed in claim 3, wherein:
   said transformer of said voltage conversion module further includes a second secondary winding capable of generating an indicating current that corresponds to the secondary side current; and
   said switching signal generating unit includes
   a subtractor coupled to said voltage-to-current converter of said detecting unit, and receiving the detecting signal from said voltage-to-current converter of said detecting unit and the adjusting signal, said subtractor being operable to output the current difference between the detecting signal and the adjusting signal, the current difference between the detecting signal and the adjusting signal increasing with time during the start period,
   an oscillator coupled to said subtractor for receiving the current difference between the detecting signal and the adjusting signal therefrom, and operable to generate an oscillating signal based on the current difference between the detecting signal and the adjusting signal,
   a zero current operator coupled to a dotted end of said second secondary winding of said transformer of said voltage conversion module for receiving the indicating current, and operable to output a sensing signal based on the indicating current, and
   an AND gate coupled to said oscillator and said zero current operator for receiving the oscillating signal and the sensing signal therefrom, and operable to output the switching signal based on the oscillating signal and the sensing signal.

7. The switching power converting apparatus as claimed in claim 6, further comprising an adjusting current generating module coupled to said subtractor of said switching signal generating unit for generating an adjusting current that is stepped down during the start period and that serves as the adjusting signal.

8. The switching power converting apparatus as claimed in claim 1, wherein:
   each of the detecting signal and the adjusting signal is a voltage signal;
   the detecting signal has a voltage value that decreases with increase of the output voltage;
   during the start period, the switching signal has a switching frequency that increases with increase of a voltage difference between the detecting signal and the adjusting signal; and
   a duty cycle that increases with increase of the voltage difference between the detecting signal and the adjusting signal.

9. The switching power converting apparatus as claimed in claim 8, wherein said detecting unit includes:
   a voltage divider coupled to said voltage conversion module for receiving the output voltage therefrom, and operable to divide the output voltage so as to output a divided voltage of the output voltage; and
   an operational amplifier having an inverting input end coupled to said voltage divider for receiving the divided voltage therefrom, a non-inverting input end adapted for receiving the predetermined reference voltage, and an output end for outputting an amplified voltage that is associated with a difference between the predetermined reference voltage and the divided voltage and that serves as the detecting signal.

10. The switching power converting apparatus as claimed in claim 9, wherein said switching signal generating unit includes:
    a subtractor coupled to said output end of said operational amplifier of said detecting unit, and receiving the amplified voltage from said output end of said operational amplifier of said detecting unit and the adjusting signal, said subtractor being operable to output the voltage difference between the detecting signal and the adjusting signal, the voltage difference between the detecting signal and the adjusting signal increasing with time during the start period; and
    an oscillator coupled to said subtractor for receiving the voltage difference between the detecting signal and the adjusting signal therefrom, and operable to generate the switching signal based on the voltage difference between the detecting signal and the adjusting signal.

11. The switching power converting apparatus as claimed in claim 10, further comprising an adjusting voltage generating module coupled to said subtractor of said switching signal generating unit for generating an adjusting voltage that is stepped down during the start period and that serves as the adjusting signal.

12. The switching power converting apparatus as claimed in claim 9, wherein:

said transformer of said voltage conversion module further includes a second secondary winding capable of generating an indicating current that corresponds to the secondary side current;

said switching signal generating unit includes
- a subtractor coupled to said output end of said operational amplifier of said detecting unit, and receiving the detecting signal from said output end of said operational amplifier of said detecting unit and the adjusting signal, said subtractor being operable to output the voltage difference between the detecting signal and the adjusting signal, the voltage difference between the detecting signal and the adjusting signal increasing with time during the start period,
- an oscillator coupled to said subtractor for receiving the voltage difference between the detecting signal and the adjusting signal therefrom, and operable to generate an oscillating signal based on the voltage difference between the detecting signal and the adjusting signal,
- a zero current operator coupled to a dotted end of said second secondary winding of said transformer of said voltage conversion module for receiving the indicating current, and operable to output a sensing signal based on the indicating current, and
- an AND gate coupled to said oscillator and said zero current operator for receiving the oscillating signal and the sensing signal therefrom, and operable to output the switching signal based on the oscillating signal and the sensing signal.

13. The switching power converting apparatus as claimed in claim 12, further comprising an adjusting voltage generating module coupled to said subtractor of said switching signal generating unit for generating an adjusting voltage that is stepped down during the start period and that serves as the adjusting signal.

\* \* \* \* \*